(12) United States Patent
Messina et al.

(10) Patent No.: US 10,726,252 B2
(45) Date of Patent: Jul. 28, 2020

(54) METHOD OF DIGITIZING AND EXTRACTING MEANING FROM GRAPHIC OBJECTS

(71) Applicant: TAB2EX, LLC, San Jose, CA (US)

(72) Inventors: Paolo Messina, San Jose, CA (US); Vincenzo Del Zoppo, San Jose, CA (US); Salvatore Messina, San Jose, CA (US); Danilo Giuffrida, Misterbianco (IT)

(73) Assignee: Tab2ex LLC, San Jose, CA (US)

( * ) Notice: Subject to any disclaimer, the term of this patent is extended or adjusted under 35 U.S.C. 154(b) by 0 days.

(21) Appl. No.: 15/982,994

(22) Filed: May 17, 2018

(65) Prior Publication Data

US 2018/0336405 A1 Nov. 22, 2018

Related U.S. Application Data

(60) Provisional application No. 62/507,513, filed on May 17, 2017.

(51) Int. Cl.
| | |
|---|---|
| *G06K 9/00* | (2006.01) |
| *G06N 5/04* | (2006.01) |
| *G06K 9/46* | (2006.01) |
| *G06K 9/62* | (2006.01) |

(Continued)

(52) U.S. Cl.
CPC ..... *G06K 9/00463* (2013.01); *G06K 9/00449* (2013.01); *G06K 9/00456* (2013.01); *G06K 9/342* (2013.01); *G06K 9/4628* (2013.01); *G06K 9/4652* (2013.01); *G06K 9/627* (2013.01); *G06N 5/046* (2013.01); *G06K 2209/01* (2013.01); *G06N 3/0454* (2013.01);

(Continued)

(58) Field of Classification Search
CPC .......... G06K 9/00463; G06K 9/00456; G06K 9/627; G06K 9/4652; G06K 9/4628; G06K 9/342; G06K 9/00449; G06K 2209/01; G06N 5/046; G06N 3/0454; G06T 2207/20072; G06T 2210/12; G06T 2207/20084
USPC ....................................................... 382/176
See application file for complete search history.

(56) References Cited

U.S. PATENT DOCUMENTS

| | | |
|---|---|---|
| 6,920,608 B1 | 7/2005 | Davis |
| 6,996,268 B2 | 2/2006 | Megiddo et al. |
| 7,254,285 B1 | 8/2007 | Paek |

(Continued)

FOREIGN PATENT DOCUMENTS

GB 2362232 A * 11/2001 ........... G06T 11/206

OTHER PUBLICATIONS

Lladós, J., and Y. B. Kwon. "Graphics Recognition, Recent Advances and Perspectives." GREC, Barcelona, Spain(2003). (Year: 2003).*

(Continued)

*Primary Examiner* — Amandeep Saini
(74) *Attorney, Agent, or Firm* — Mark Young, P.A.

(57) ABSTRACT

Using a convolutional neural network, a method for digitizing and extracting meaning from graphic objects such as bar and pie charts, decomposes a chart into its sub-parts (pie and slices or bars, axes and legends) with significant tolerance to the wide range of variations in shape and relative position of pies, bars, axes and legends. A linear regression calibration allows properly reading values even when there are many OCR failures.

20 Claims, 11 Drawing Sheets

(51) Int. Cl.
  *G06K 9/34* (2006.01)
  *G06N 3/04* (2006.01)
(52) U.S. Cl.
  CPC ............... *G06T 2207/20072* (2013.01); *G06T 2207/20084* (2013.01); *G06T 2210/12* (2013.01)

(56) References Cited

U.S. PATENT DOCUMENTS

| | | | |
|---|---|---|---|
| 7,882,002 | B2 | 2/2011 | Monroe et al. |
| 7,962,861 | B2 | 6/2011 | Erwin et al. |
| 9,424,670 | B1* | 8/2016 | Jin .................... G06T 11/206 |
| 2008/0086679 | A1 | 4/2008 | Gazzillo et al. |
| 2010/0325166 | A1 | 12/2010 | Rubin et al. |
| 2010/0325564 | A1 | 12/2010 | Mital et al. |
| 2011/0271172 | A1 | 11/2011 | Radakovitz et al. |
| 2013/0038628 | A1* | 2/2013 | Look .................... G06K 9/3216 345/622 |
| 2013/0138577 | A1 | 5/2013 | Sisk |
| 2013/0173215 | A1 | 7/2013 | Patankar |
| 2015/0049951 | A1 | 2/2015 | Chaturvedi et al. |
| 2016/0055659 | A1 | 2/2016 | Wilson et al. |
| 2016/0132215 | A1 | 5/2016 | Zhang |
| 2017/0140396 | A1 | 5/2017 | Amram |
| 2017/0161354 | A1 | 6/2017 | Cho |
| 2017/0185835 | A1* | 6/2017 | Appel ................. G06K 9/00476 |
| 2017/0351708 | A1 | 12/2017 | Lahmann et al. |
| 2019/0197154 | A1* | 6/2019 | Cohen .................... G06T 11/206 |
| 2019/0266434 | A1* | 8/2019 | Yu .......................... G06K 9/469 |

OTHER PUBLICATIONS

Rabah A Al-Zaidy and C Lee Giles. Automatic extraction of data from bar charts. In Proceedings of the 8th nternational Conference on Knowledge Capture, p. 30. ACM, 2015.
Aaron Baucom and Christopher Echanique. Scatterscanner: Data extraction and chart restyling of scatterplots. 2013.
John Canny. A computational approach to edge detection. IEEE Transactions on pattern analysis and machine intelligence, (6):679-698,1986.
Daniel Chester and Stephanie Elzer. Getting computers to see information graphics so users do not have to. In International Symposium on Methodologies for Intelligent Systems, pp. 660-668. Springer, 2005.
Sagnik Ray Choudhury and Clyde Lee Giles. An architecture for information extraction from figures in digital libraries. In WWW (Companion Volume), pp. 667-672, 2015.
Sagnik Ray Choudhury, Prasenjit Mitra, Andi Kirk, Silvia Szep, Donald Pellegrino, Sue Jones, and C Lee Giles. Figure metadata extraction from digital documents. In Document Analysis and Recognition (ICDAR), 2013 12th International Conference on, pp. 135-139. IEEE, 2013.
Martin Ester, Hans-Peter Kriegel, Jörg Sander, Xiaowei Xu, et al. A density-based algorithm for discovering clusters in large spatial databases with noise. In Kdd, vol. 96, pp. 226-231, 1996.
Martin A Fischler and Robert C Bolles. Random sample consensus: a paradigm for model fitting with applications to image analysis and automated cartography. Communications of the ACM, 24(6):381-395, 1981.
T Huang, Gjtgy Yang, and G Tang. A fast two-dimensional median filtering algorithm. IEEE Transactions on Acoustics, Speech, and Signal Processing, 27(1):13-18, 1979.

Weihua Huang, Ruizhe Liu, and C-L Tan. Extraction of vectorized graphical information from scientific chart images. In Document Analysis and Recognition, 2007. ICDAR 2007. Ninth International Conference on, vol. 1, pp. 521-525. IEEE, 2007.
Weihua Huang, Chew Lim Tan, and Wee Ki-Ieng Leow. Model-based chart image recognition. In International Workshop on Graphics Recognition, pp. 87-99. Springer, 2003.
Weihua Huang, Siqi Zong, and Chew Lim Tan. Chart image classification using multipleinstance learning. In Applications of Computer Vision, 2007. WACV'07. IEEE Workshop on, pp. 27-27. IEEE, 2007.
Po-Shen Lee, Jevin D West, and Bill Howe. Viziometrix: A platform for analyzing the visual information in big scholarly data. In Proceedings of the 25th International Conference Companion on World Wide Web, pp. 413-418. International World Wide Web Conferences Steering Committee, 2016.
Nimrod Megiddo and Shivakumar Vaithyanathan. System and method for gathering, indexing, and supplying publicly available data charts, Feb. 7 2006. U.S. Pat. No. 6,996,268.
V Shiv Naga Prasad, Behjat Siddiquie, Jennifer Golbeck, and Larry S Davis. Classifying computer generated charts. In Content-Based Multimedia Indexing, 2007. CBMI'07. International Workshop on, pp. 85-92. IEEE, 2007.
Manolis Sawa, Nicholas Kong, Arti Chhajta, Li Fei-Fei, Maneesh Agrawala, and Jeffrey Heer. Revision: Automated classification, analysis and redesign of chart images. In Proceedings of the 24th annual ACM symposium on User interface software and technology, pp. 393-402. ACM, 2011.
Yan Ping Zhou and Chew Lim Tan. Hough technique for bar charts detection and recognition in document mages. Proceedings 2000 International Conference on image Processing (Cat. No. 00CH37101), Vancouver, BC, Canada, 2000, pp. 605-608 vol. 2.
L Battle, P Duan et al. Beagle: Automated Extraction and Interpretation of Visualizations from the Web. arXiv:1711.05962v1 [cs.HC] Nov. 16, 2017.
Poco Jorge, and Jeffrey Heer. "Reverse-Engineering Visualizations: Recovering Visual Encodings from Chart Images." Computer Graphics Forum. vol. 36. No. 3. 2017.
Cliche, Mathieu, et al. "Scatteract: Automated extraction of data from scatter plots." Joint European Conference on Machine Learning and Knowledge Discovery in Databases. Springer, Cham, 2017.
Kafle, Kushal, et al. "DVQA: Understanding Data Visualizations via Question Answering." arXiv preprint arXiv:1801.08163(2018).
Jung, Daekyoung, et al. "ChartSense: Interactive data extraction from chart images." Proceedings of the 2017 CHI Conference on Human Factors in Computing Systems. ACM, 2017.
Kuhn, Harold W. "The Hungarian method for the assignment problem." Naval Research Logistics (NRL) 2.1-2 (1955): 83-97.
Krizhevsky, Alex, Ilya Sutskever, and Geoffrey E. Hinton. "Imagenet classification with deep convolutional neural networks." Advances in neural information processing systems. 2012.
Simard, Patrice Y., David Steinkraus, and John C. Platt. "Best practices for convolutional neural networks applied to visual document analysis." ICDAR. vol. 3. 2003.
Huang, Jonathan, et al. "Speed/accuracy trade-offs for modem convolutional object detectors." IEEE CVPR. 2017.
Huber, Peter J. "Robust estimation of a location parameter." The annals of mathematical statistics (1964): 73-101.
Suzuki, Kenji, Isao Horiba, and Noboru Sugie. "Linear-time connected-component labeling based on sequential local operations." Computer Vision and Image Understanding 89.1 (2003): 1-23.

* cited by examiner

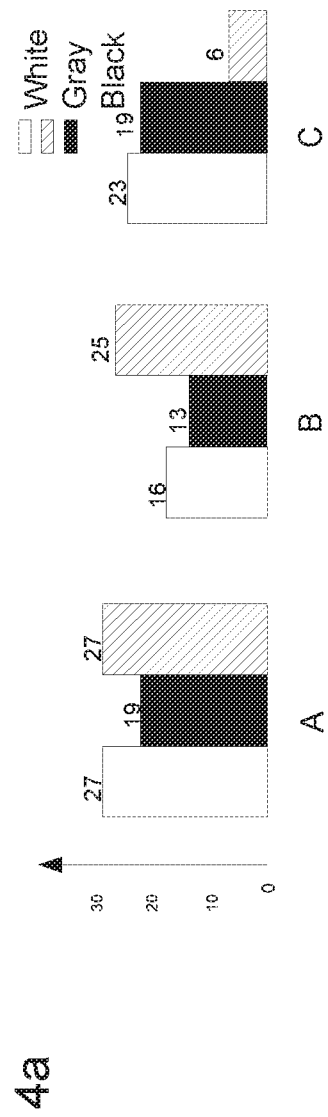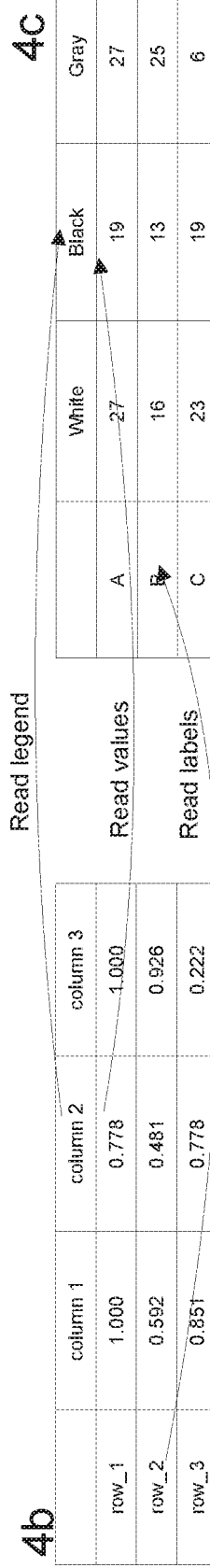
FIGs. 4a, 4b and 4c.

METHOD OF DIGITIZING AND EXTRACTING MEANING FROM GRAPHIC OBJECTS

RELATED APPLICATION

This application is a nonprovisional of and claims the benefit of priority of U.S. Provisional Application 62/507,513 filed 17 May 2017, the entire contents of which are incorporated herein by this reference and made a part hereof.

FIELD OF THE INVENTION

This invention relates generally to chart extraction, and, more particularly, to a machine learning based method for digitizing and extracting meaning from graphic objects.

BACKGROUND

The operation of visualizing and collecting data into meaningful images ("Data visualization") plays a crucial role in knowledge discovery and transfer, both in academic and industrial applications. The inverse problem, i.e. the understanding and conversion of a visual graphics into the data it is representing ("Chart extraction"), is an essential business and scientific intelligence process that only humans so far can undertake. In secondary market research, analysts surf the web and other document reports from public and private sources to identify, extract and aggregate information into easy to consume visual forms. Likewise, the ability to retrieve the real data included into charts and graphs is very useful in the field of cloud storage to help professional analysts within companies and enterprises to easily identify, extract and repurpose information from one document to another.

Despite several academic papers and patents published on the subject of chart classification or search, the methodologies taught make use of only the chart images, while little or none of the information within the graphic is extracted or interpreted automatically. This limits the ability to leverage the information entrapped in the charts for improving document search and classification in emerging digital data storage such as the cloud storage industry. The chart extraction process still lies in a prototypical stage. Prior algorithms for performing data extraction rely on several simplistic assumptions concerning the shape of the examined chart and are based on arbitrary thresholds, which restrict their applicability to a few "ideal" cases.

As one example, previous work on pie chart extraction is suitable only for elliptical or 3d charts with precise and defined contours. However, in real cases, it is very common to find "exploded" pie charts (i.e. with one or more slices detached from the others), donut charts (i.e. annular with a hole in the center), multi-series pie charts, and any possible combination of all the pie charts categories mentioned above.

Bar chart extraction has received more attention, but the algorithms have been developed by leveraging small sample sets that drastically underestimate the actual variety of charts found in information graphics. The field of applications of information graphics are varied and include marketing research reports, financial and econometrics reports as well as the world wide web in its entirety (e.g. web blogs, web publications, web social media (Stock twitter) and many others). The algorithms for bar chart data extraction are typically based on simple heuristics, and are still lacking machine intelligence to account for the multitude of real life charts encountered in digital documents and the web.

Some prior works exploit much bigger datasets and deep learning models such as Convolutional Neural Networks, but they only focus on the extraction of high level information, such as chart type, axes titles or value ranges. The main target of these works is to make high-level query answering systems, rather than to reach a detailed data extraction and interpretation of the visual graphic.

In known prior art, it is often assumed that the image is high quality or in vector format, so that the text is perfectly readable and there are no compression artifacts. Conversely, in real applications it is very common to deal with images with lossy compression (jpeg, gif) or small size images for which entrapped graphical information is difficult to extract.

As the algorithms reported in prior art are not meant for real industrial applications, such as batch processes or real time software as a service (SAAS) applications, little investigation has been done on how to achieve the best data capture precision in the smallest amount of time. Some prior art efforts report an average of 1225 seconds to extract a pie chart and 100 seconds for a bar chart. These performance are not acceptable for real industrial applications. The reported processing times are absolutely order of magnitude above what a real industrial application demands. Most of the preexisting methods are restricted to the realm of pure proof of concept demonstration.

Prior art has not paid enough attention to text extraction and text-data aggregation. This is because it is often assumed that the final result may be manually adjusted by user intervention, rather than assuming a real case application scenario where manual intervention by a human being will unavoidably drastically reduce the industrial benefit of the extraction process. A real application in the field of marketing research, financial research, econometrics research and more broadly information search and retrieval, requires a fully-automatic system. If a human being has to manually edit each extracted pie or bar chart, the actual process benefit in terms of time saved and man power saved becomes marginal and adoption of such technology would be low.

The invention is directed to overcoming one or more of the problems and solving one or more of the needs as set forth above. The invention provides fast and fully automated information graphic data capture with information graphics understanding system for real applications.

SUMMARY OF THE INVENTION

To solve one or more of the problems set forth above, in an exemplary implementation of the invention, using a convolutional neural network, a method for digitizing and extracting meaning from graphic objects such as bar and pie charts, and decomposes a chart into its sub-parts (pie and slices or bars, axes and legends) with significant tolerance to the wide range of variations in shape and relative position of pies, bars, axes and legends. A linear regression calibration allows properly reading values even when there are many OCR failures.

In one embodiment, the chart extraction method entails receiving an image of a chart in a convolutional neural network. Bounding boxes are defined in the image corresponding to graphically represented data (e.g., pies, slices, bars) in the image. A relative position, a color and a value for each bounding box corresponding to graphically represented data are determined. At least one bounding box is defined in the image corresponding to at least one of a legend and axis (e.g., a legend, an x-axis, a y-axis, and a right-axis). If a legend is included, the legend may be parsed. A relative position and an area for each bounding box corresponding to at least one of a legend and axis are determined. Bounding boxes in the image corresponding to text are defined. A relative position of each bounding box corresponding to text is determined. Optical character recognition, with a robust calibration using linear regression, is performed on each bounding box corresponding to text. Text (e.g., words and/or numerical values) are associated with corresponding slices, bars, axes, legends or other decomposed elements. The following are written to a file (e.g., a JSON file): the relative position, color and value for each bounding box corresponding to graphically represented data; the relative position and area for each bounding box corresponding to at least one of a legend and axis; and the relative position of each bounding box corresponding to text, and the corresponding text.

If the image of a chart is an image of a pie chart, including a plurality slices, each slice comprises a percentage of the pie chart and each slice may have a color. The step of defining bounding boxes in the image corresponding to graphically represented data in the image may then entail determining the percentage for each slice and determining the color for each slice. Additionally, a center and a radius of the pie chart may be determined. The pie chart may then be cropped and transformed into a new image by applying a polar transformation using the center and radius of the pie chart. The new image comprises a plurality of bars, each of the plurality of bars representing a slice. If the pie chart is a three dimensional pie chart, then the step of defining bounding boxes in the image corresponding to graphically represented data in the image may first entail applying a perspective correction to the pie chart.

If the image of a chart is an image of a bar chart including a plurality bars, including a longest bar, each bar may have a length and a color. The step of defining bounding boxes in the image corresponding to graphically represented data in the image may then further entail determining a ratio of the length of each bar to the length of the longest bar, and determining the color for each bar.

BRIEF DESCRIPTION OF THE DRAWINGS

The foregoing and other aspects, objects, features and advantages of the invention will become better understood with reference to the following description, appended claims, and accompanying drawings, where:

FIGS. 3a & 3b are examples of single-series bar charts, with respectively vertical and horizontal orientation. FIGS. 3c & 3d are examples of multi-series bar charts, respectively with grouped and stacked arrangement.

FIGS. 4a, 4b and 4c conceptually illustrates conversion of a bar chart into a table. The bar chart of FIG. 4a is converted into a table with default (scaled) values and labels, as in FIG. 4b. The real values and labels are then obtained using the text extraction and aggregation modules to produce the final output, as in FIG. 4c.

FIG. 5a is a simple circular pie chart. FIG. 5b is a donut pie chart with a legend. FIG. 5c is an exploded pie chart. FIG. 5d is a 3D pie chart. The pie chart is converted into a table with default (scaled) values and labels, as in FIG. 5e. The real values and labels are then obtained by using the text extraction and aggregation modules to produce the final output, as in FIG. 5f.

Figure 1:
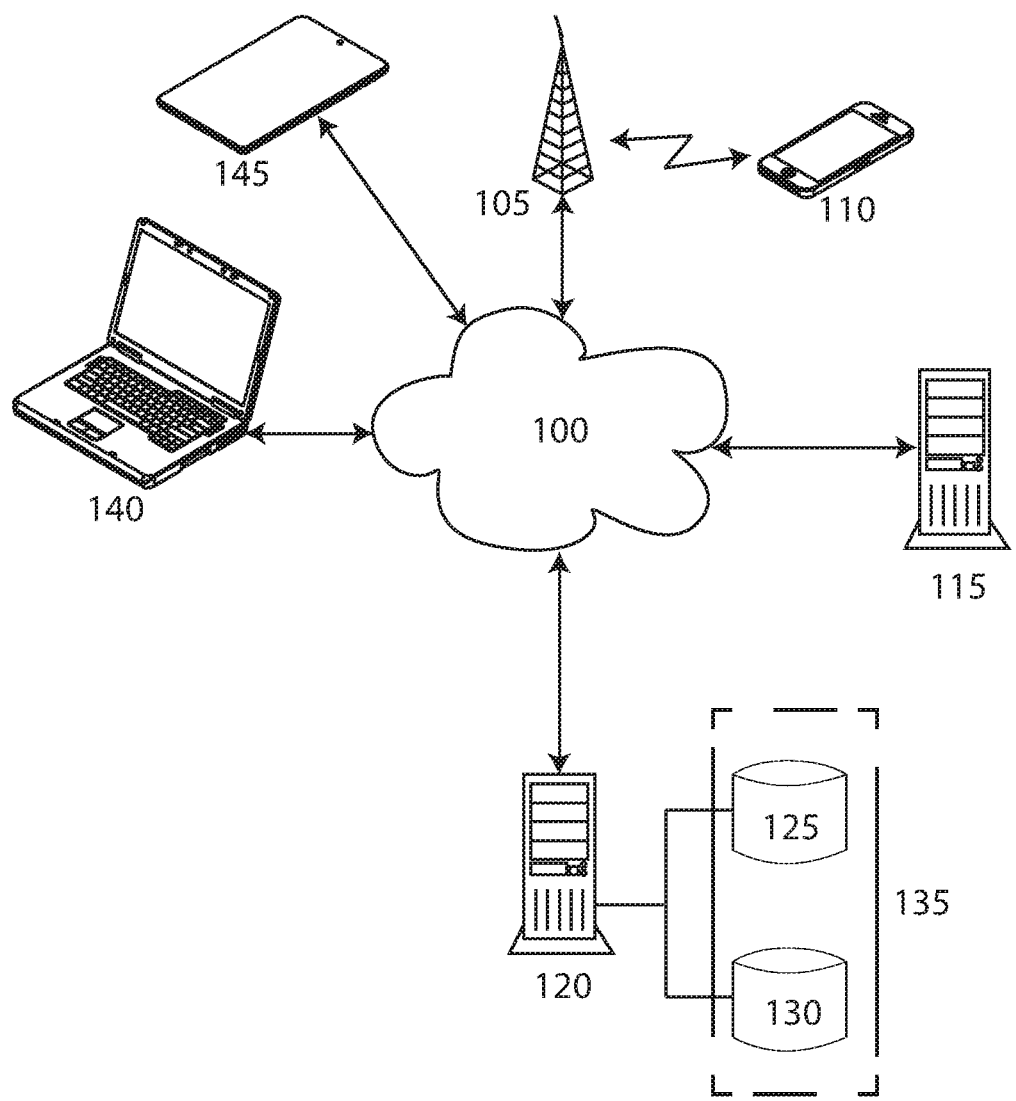
FIG. 1 is a high level block diagram that conceptually illustrates components of exemplary hardware and a network through which a methodology according to principles of the invention may be implemented.

Those skilled in the art will appreciate that the figures are not intended to be drawn to any particular scale; nor are the figures intended to illustrate every embodiment of the invention. The invention is not limited to the exemplary steps, sequence of steps, embodiments depicted in the figures or the specific components, configurations, shapes, relative sizes, ornamental aspects or proportions as shown in the figures.

DETAILED DESCRIPTION

An implementation of the present invention may be embodied in hardware and/or in software (including firmware, resident software, micro-code, etc.). Furthermore, the present invention may take the form of one or more computer program products on one or more computer-usable or computer-readable storage media having computer-usable or computer-readable program code embodied in the media for use by or in connection with an instruction execution system. A computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific non-limiting examples (a non-exhaustive list) of a computer-readable medium include random access memory (RAM), a read-only memory (ROM), an erasable programmable read-only memory (EPROM or Flash memory), a hard disk drive, a solid state drive, a portable compact disc read-only memory (CD-ROM), a Blu-ray disc (BD) or other media on which an executable program may be stored for execution by a compatible computing device.

Computer program code or "code" for carrying out operations (e.g., steps) according to the present invention may be written in any programming language compatible with the corresponding computing devices and operating systems. Software embodiments of the present invention do not depend on implementation with a particular programming language.

The computer program code may be provided to a processor of a general-purpose computer, special purpose computer, or other programmable computing apparatus (e.g., a phone, personal digital assistant, tablet, laptop, personal computer, or computer server) as instructions to produce a machine, such that the instructions, which execute via the processor of the computer or other programmable data processing apparatus, create means for implementing the functions specified in the illustrations. The computer code may be stored in a computer-readable memory that can direct a computer or other programmable data processing apparatus to function in a particular manner, such that the instructions stored in the computer-readable memory produce an article of manufacture including instruction means which implement the functions and perform the steps specified in the illustrations and described herein.

A program performing a methodology according to principles of the invention may be stored on an end-user's computing device. In such case, the end-user executes the program to process one or more files, documents or pages that contain graphic objects such as charts or graphs. The program may be used to process one or more such files, documents or pages. The program may be a standalone program or a component (e.g., function, extension, add-on, plugin or subprogram) of another program.

Alternatively, a program performing a methodology according to principles of the invention may be stored and executed on a remote computing device. Referring now to FIG. 1, a high level block diagram of hardware components of a system according to principle of the invention is conceptually illustrated. The remote computing device may be a server 120 accessible via a network, such as the internet 100, a local area network and/or a wide area network. The program may be stored on one or more data storage devices 125, while data processed and/or generated by the program may be stored on one or more of the same or other data storage devices 130.

Consistent with the present invention, users of the system may use computing devices, such as a cellular phones (i.e., smart phone) 110, a tablet 145, a laptop computer 140, or a desktop computer 115, communicating in a wireless or wired mode via the network 100. The computing devices (i.e., clients or client devices) are equipped with software for inputting and displaying information in accordance with the methodologies described herein. Some of the computing devices 110 may be equipped with cellular wireless communication modules providing internet access via wireless cellular communication infrastructure 105.

The term "service provider" is used herein to mean any entity that provides a service using a system or methodology according to principles of the invention. The service provider may be, for example, an online service provider with a web-accessible system that receives and processes documents containing graphic objects, such as charts and graphs, according to principles of the invention. The term "consumer," "user" or "end user" is used herein to mean any individual or entity that requests or uses such service, whether for free or in exchange for compensation. The term "user" or "end user" is used herein to mean any individual or entity that uses a methodology according to principles of the invention, such as a software implemented methodology.

In one implementation, a service provider provides a chart extraction service, and, more particularly, a machine learning based software implemented method for digitizing and extracting meaning from graphic objects according to principles of the invention. In another implementation, a search service provider utilizes a machine learning based software implemented method for digitizing and extracting meaning from graphic objects according to principles of the invention to provide chart data in response to user queries. In another implementation, a service provider may offer products (e.g., research services and reports) containing chart data derived from a machine learning based software implemented method for digitizing and extracting meaning from graphic objects according to principles of the invention.

The invention comprises a new process for performing chart extraction from images of pie charts and bar charts. The methodology understands and extracts data from a large variety of charts, sourced from the most diverse and disparate business, technical and scientific applications.

Figure 2:
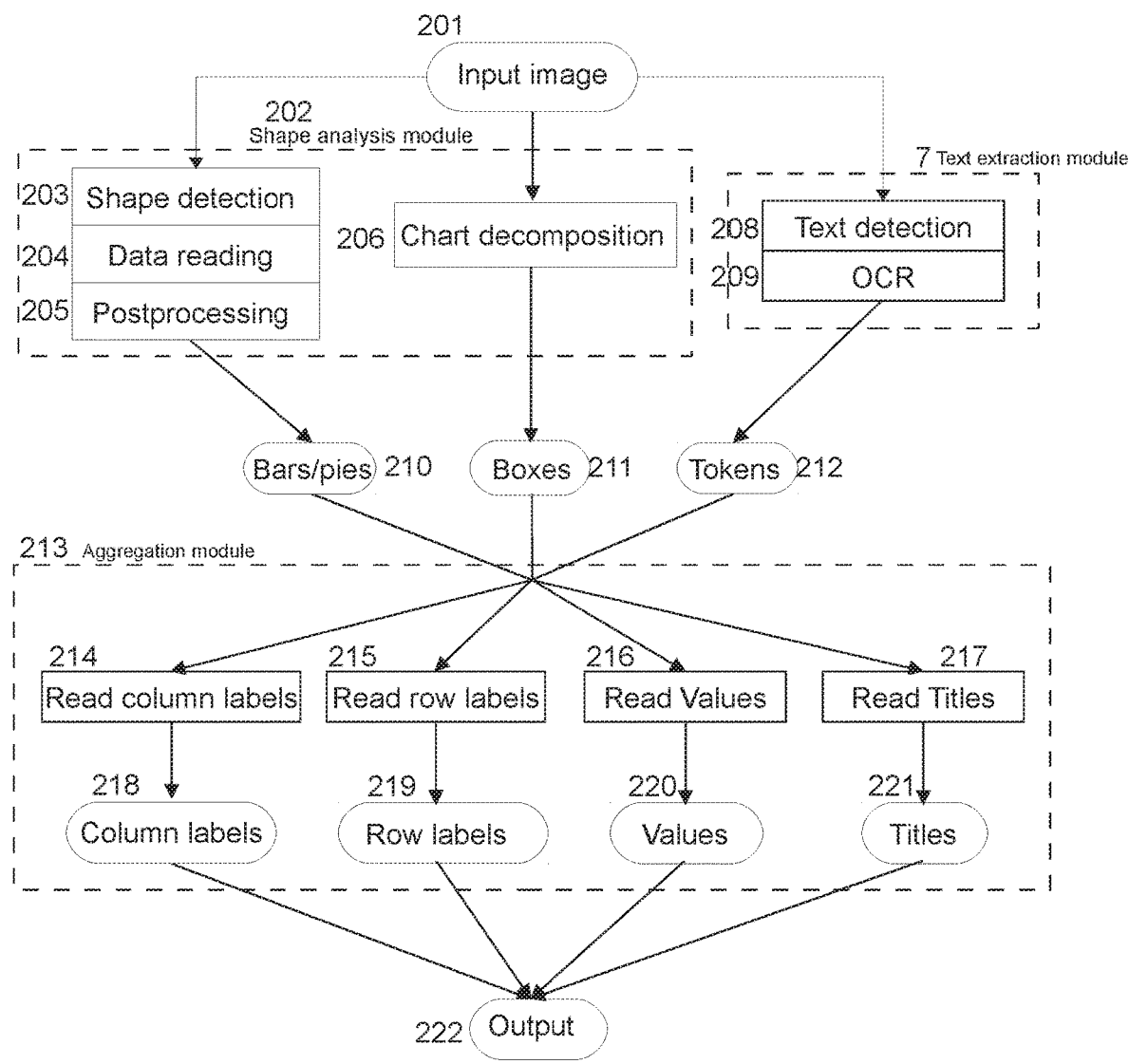
FIG. 2 is a high level flowchart that provides a process overview, whereby data is extracted from an input image by reading shapes and text, and the two information flows are subsequently aggregated.

A general flow of the methodology is shown in FIG. 2. The input of the algorithm is an image 201 containing a bar chart. The input file can be one of the most common image formats (png, jpeg, bmp, gif, tiff and others). The image is processed by a shape analysis module 202 that combines image processing and machine intelligence to extract the data from the chart. Shape analysis entails shape detection 203, data reading 204 and postprocessing 205, as well as chart decomposition 206. Another module, a text extraction module 207, provides textual information detection 208, which is then fed to an Optical Character Recognition (OCR) module 209. The two information streams, data from visual 210, 211 and textual strings (tokens) 212 are aggregated by an aggregation module 213 to produce output in the form of a file representing the extracted data from the charts 222. The aggregation module 213 reads column labels 214, row labels 215, values 216 and titles 217 from the outputs 210-212 from the shape analysis 202 and text extraction 207 modules. The aggregation module 213 then writes to an output file the read column labels 218, row labels 219, values 220 and titles 221. The output file 222 contains meta-information about title, values, labels, colors, and layout of the chart. The result can be further exploited for data mining applications, search engines, advanced semantic queries or to re-purpose the chart in a new, more meaningful or interactive, representation.

Figures 3A, 3B, 3C, 3D:
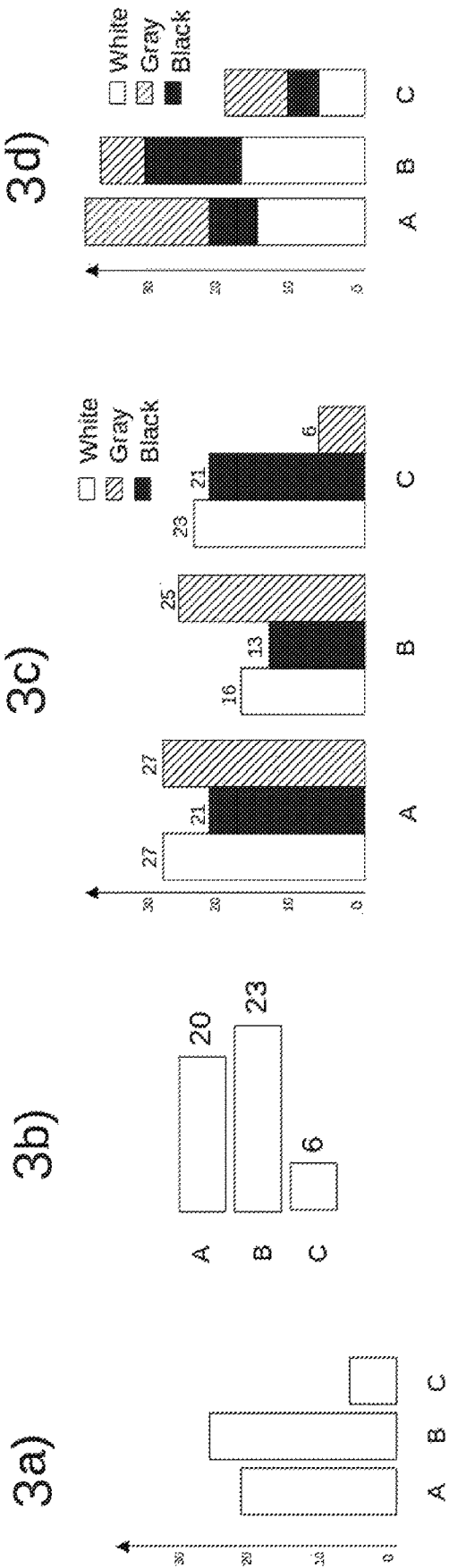
FIGS. 3a, 3b, 3c and 3d provide examples of charts.

FIGS. 3a & 3b are examples of single-series bar charts, with respectively vertical and horizontal orientation. FIGS. 3c & 3d are examples of multi-series bar charts, respectively with grouped and stacked arrangement. Bar charts can be either vertical (FIG. 3a) or horizontal (FIG. 3b), depending on the orientation of the bars. The following description will focus on vertical bar charts, since the extension to the horizontal case is straightforward. More importantly, bar charts are divided into "single series" (or "simple") (FIGS. 3a, 3b) and "multi-series" (FIG. 3c, 3d). Single series bar charts represent a simple table with one column for the labels and another for the values. Multi-series bar charts contain multiple data series inside the same graphic object and represent a table with one column for the labels and one column for each of the data series. Multi-series bar charts can be "stacked" (FIG. 3d) or "grouped" (FIG. 3c). Each row of the table is graphically represented by a bar (simple bar charts), or a stack of bars (stacked bar charts), or a cluster of bars (grouped bar charts). The columns of the tables are graphically represented by the distinct color groups of the bars, and their names are usually found by looking at the legend.

FIGS. 4a-c conceptually illustrate a process of converting a bar chart of FIG. 4a into a table with default (scaled) values and labels, as in FIG. 4b. The real values and labels are then obtained by using the text extraction 207 and aggregation 213 modules to produce the final output, a chart with real values, as in FIG. 4c. To perform the process a bar reader process according to principles of the invention is performed.

An exemplary bar reader process according to principles of the invention is composed of three main modules, as shown in FIG. 2. A shape analysis module 202 extracts raw data described by the chart, but without exploiting any textual information. This module 202 is composed of four blocks, each block representing one or more steps to perform a task. In a chart decomposition block 206, an input image 201 is fed into a convolutional neural network (i.e., ConvNet) whose output are bounding boxes (FIG. 1-6, FIG. 1-7). The bounding boxes identify the location and area covered by the "X axis", "Legend", "left Y axis" and "Right Y axis". Identifying these 4 objects types is used to improve the overall accuracy and robustness of the process.

In a shape detection block 203, the input image 901 is passed to a pipeline that detects all the bars in the image. The bars are referred to as "stacks," since they can be composed of multiple sub-bars, as in the example of stacked bar charts.

In a data reading block 204, the stacks detected by the shape detection block 203 are segmented into their inner constituents. In this way, the set of bars included in each stack is fully identified. In this stage, the process associates each bar with its Y axis value.

In a postprocessing block 205, the set of bars identified in the data reading block 204 are processed using machine-learning. Such machine learning leverages spatial and color information to determine whether the chart is stacked, grouped or single series. Final output of the shape analysis module is a table like the one in shown in FIG. 3-a. Such a table is built using default labels ("row 1", "row 2" . . . "column 1", "column 2" . . . ) and values (by dividing the bar heights by the image height).

A text extraction module 207, detects and digitizes any text in the chart image. The text can be located anywhere in the chart, and can have arbitrary rotation and arbitrary color combination between the text itself and the text background. The text detection step 208 detects all the words in the image and for each word returns a rotated rectangle and the rotation angle. The rotated rectangles are sent to an OCR system 209 which is capable to read the text inside them. The rotated text is particularly important in bar charts, since the labels of the X axis are often rotated, as well as the title and the numbers of the Y axis.

In an aggregation module 213 objects 210, 211 extracted in the shape analysis module 202 are combined with the text 212 obtained in text extraction module 207 in order to achieve a complete reconstruction of the data used to generate the chart. The aggregation module consists of four submodules.

A read column labels submodule 214 reads chart labels. If a bar chart is multi-series, the labels of the color groups can be usually found in a legend. These labels 218 correspond to the labels of the columns in the extracted table, FIGS. 4b & 4c.

A read row labels module 215 uses spatial association guided by supervised learning to match each bar/stack with a label. In the case of grouped bar charts, the labels are related to a cluster of bars rather than a single bar as in FIGS. 2c & 2d. These labels 219 correspond to the labels of the rows in the extracted table, FIGS. 4b & 4c.

A read values module 216, via robust calibration, creates a mapping between the pixel coordinates and the axis values, which allows the proper scaling of the values 220 of the bars, as in FIG. 4b.

A read titles module 217 recognizes the titles 921 (i.e. title of the chart and the titles of the axes) using supervised learning, which exploits the relative position of the text with respect to the previously detected axes. The result is exported (e.g., written) to an output file 222 (e.g., a JavaScript Object Notation [JSON] file) (FIG. 1-22) containing the values, labels, colors, group labels, titles and layout.

Figures 5A, 5B, 5C, 5D, 5E, 5F:
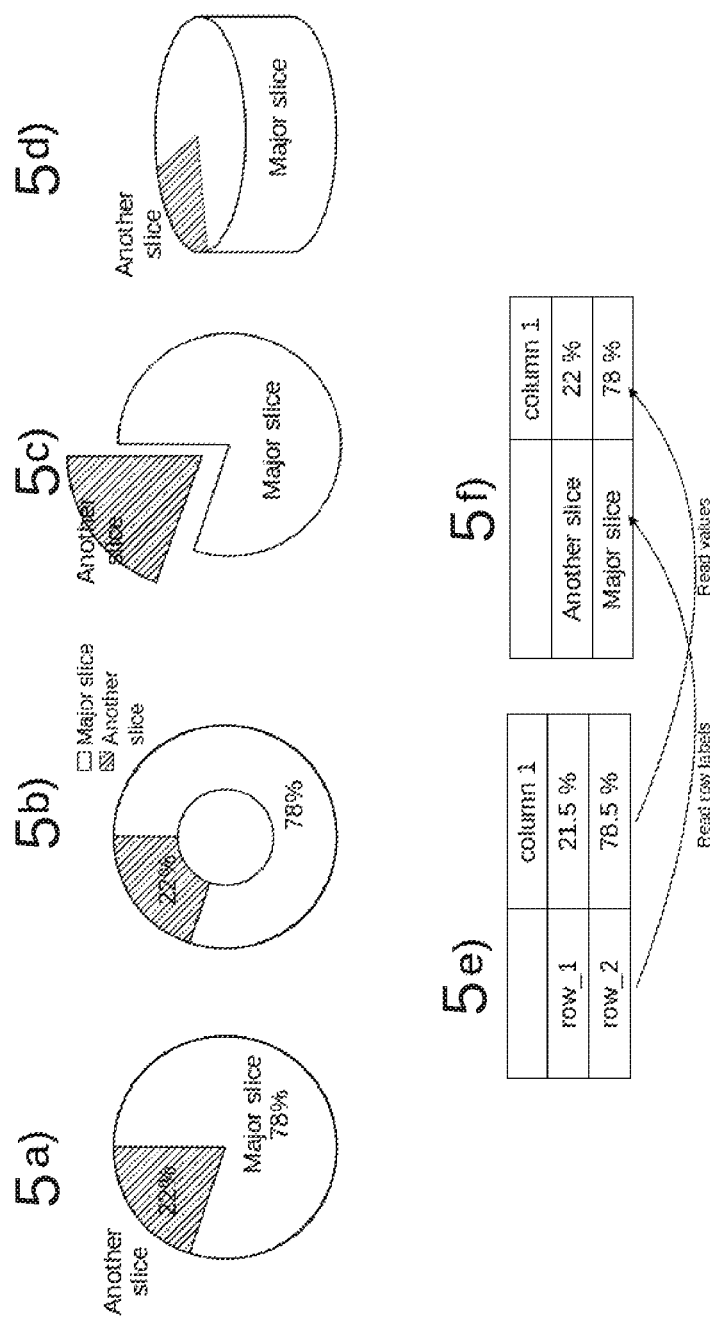
FIGS. 5a through 5f show pie charts and corresponding tables.

The process to read pie charts shares the same structure with the process to read bar charts. FIG. 5a is a simple circular pie chart. FIG. 5b is a donut pie chart with a legend. FIG. 5c is an exploded pie chart. FIG. 5d is a 3D pie chart. The pie chart is converted into a table with default (scaled) values and labels, as in FIG. 5e. The real values and labels are then obtained by using the text extraction and aggregation modules to produce the final output, as in FIG. 5f.

The table from which a pie chart was generated is usually composed by one column containing the labels and another one containing the data. For multiple pie charts there is one column for each pie in the image. An image is input, as in 201. The shape analysis module 202 performs chart decomposition 206 and shape detection 203. The input image is sent to a convolutional neural network able to output bounding boxes of all the pie slices and a bounding box for the legend in the image. The shape analysis module 202 also performs data reading 204. Each detected pie chart is converted into an array of percentages and colors describing the slices. In order to do so, the pie chart is first cropped and transformed into a new image by applying a polar transformation using the center and radius of the pie chart. In this way, the pie chart is "unrolled" into a sequence of colored bars and can be read using the same method to read bar charts. This allows reading very thin slices that are unavoidably lost by other methods. A perspective correction is applied in case of 3D pie charts.

As in the extraction of bar charts, the role of the text extraction module 207 is to detect and digitize any text in the chart image by performing text detection 208 and OCR 209. The main difficulty for pie charts is given by the text intersecting the slices, and by the arbitrary color combination of text and background. In the aggregation module 913, the shapes extracted in the shape analysis module 202 are matched with the text obtained in the text extraction module 207. Row labels are read as in 215. This step first checks whether a legend box is present in the boxes of the chart decomposition convolutional neural network. If the legend is found, as in FIG. 5b, the subprocess parses the legend in a similar way as previously explained for the bar chart subprocess. If the legend is not found, as in FIG. 5a, the labels must be searched around or inside the pie. In such case, the text is first aggregated to form blocks, and each slice is matched to the corresponding block based on a spatial association. If the input image contains multiple pie charts in the same chart, each of them will represent a column in the table representing the extracted data. In this case, the title of each pie charts are recognized and read, as in the read column labels step 214. Finally, if the charts explicitly contain the values written as percentages, as in FIG. 5a, these are used to correct the extracted values, in the read values step 216. The result is finally exported to a JSON file containing the values, labels, colors, title and layout of the pie chart, as output step 222.

Figure 6:
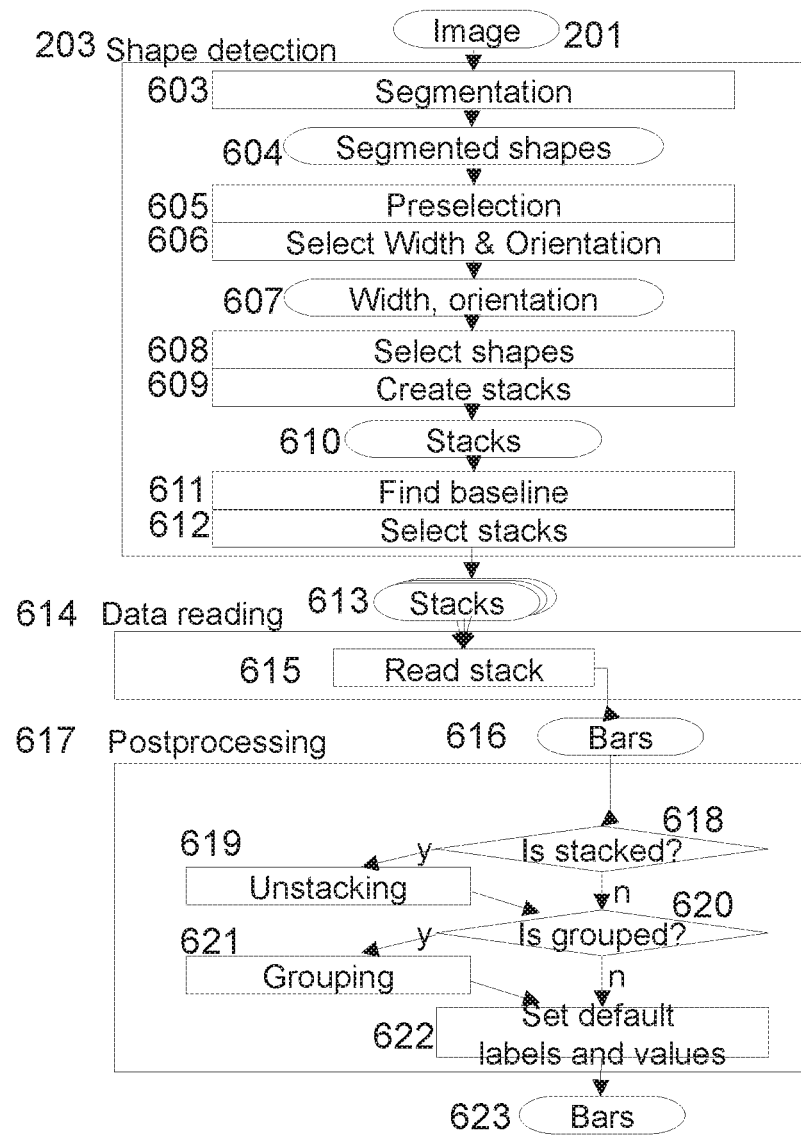
FIG. 6 is a high level flowchart of exemplary shape analysis steps for a methodology according to principles of the invention.

With reference to FIG. 6, shape detection 203, is described in greater detail. The image 201 is first fed into a segmentation subprocess 603 that creates a set of shapes 604 (called S in the following), including the rectangles of the bars among the others. The segmentation subprocess consists of median denoising, edge detection and connected component labeling. The elementary shapes S detected in the segmentation process 604 enter a preselection stage 605 able to "loosely" distinguish the candidate bars: S'⊆ S i.e. to exclude irregular shapes such as text or other objects. This is done by means of a supervised learning classifier using shape descriptors (area, perimeter, position, bounding box, etc.) as training and predictive features. The classifier is trained on a large corpus of bar charts sourced from digital documents and the web. The classifier also assigns a probabilistic value ($p_i$) to each detected shape shape, in a way such to quantify the probability that the given shape is a bar.

The select width and orientation step 606 recognizes the proper set of shapes of bars (called B in the following). Since the bars represented in the same bar chart share the same width, the density-based spatial clustering of applications with noise data clustering algorithm known as DBSCAN is applied on the preselected shapes. Without knowing the orientation of the chart (vertical or horizontal), the clustering is applied twice (separately) to the horizontal width (dx) and to the vertical width (dy) of the objects in the set of shapes S'. All the resulting clusters coming from both applications of the DBSCAN are collected together and are then fed into a classifier. The classifier out determines if the bars' orientation is vertical or horizontal. Such classifier exploits group features such as the average width in the group, the standard deviation of the width in the group, the sum of the areas of the bounding boxes in the group, and the likelihoods $p_i$ of the bars resulting from the preselection. The classifier assigns then a likelihood to each cluster, indicating the probability of being a set of bar charts. The group with the highest likelihood is finally chosen. In this way, the orientation (horizontal/vertical) and the width w of the bar chart are precisely determined, as in step 607. The bars are then selected from the shapes S as those objects having nearly dx=w (if the orientation is vertical) or dy=w (if the orientation is horizontal), as in step 608.

In stacks creation and selection, steps 609-613, the bars are now aggregated to form stacks by merging them in the vertical/horizontal direction for vertical/horizontal bar charts respectively, as in step 609. The method described so far allows to properly select the set of bars, however some extra shapes may be included in the bar set S' (e.g. some legend marks or other rectangular shapes present in the image). In order to remove such unwanted items from the set, the subprocess recognizes the baseline (i.e. the vertical position representing the zero for the bars) using a clustering approach on the bar edges. This also allows detecting the baseline also in non-trivial situations where the bar chart is stacked and some portion of the stacks are negative. After the baseline is detected, the stacks not intersecting the baseline are removed and this process solves the problem with the extra shapes described above.

In the data reading step 614, all the detected stacks 613 are scanned along their vertical axis to segment them into their sub-parts using color segmentation 615. This step allows reading very small bars present in some stacked bars which cannot be read with the stack creation and selection method described above. This process also eliminates the effect of spurious text present within the bars. At the end of this stage, the process outputs a set of rectangles 616, each having its coordinates, its color and a number specifying the stack it belongs to.

Postprocessing 617, the final stage of the shape analysis module, aims at producing the output to be finally adjusted with the textual information. The process first determines whether the bar chart is stacked or not 618. This is achieved by a supervised classifier on the features from the extracted bars, such as the color sequence and the number of bars in each stack. If the bar chart is considered stacked, all the bars inside the stack are kept, otherwise only the biggest bar is kept from each stack 619.

The bars are then fed into another classifier determining whether the bar chart is grouped or not 620. The features used in this stage are again the color sequence and relative positions of the bars. A unique binary classifier determining whether the chart is grouped or stacked cannot be created, because it would miss the mixed case of stacked-grouped charts. If the chart is considered grouped, the stacks are aggregated to form clusters by looking at their color sequence and position 621. Then labels and values are associated with each stack, 622, to define each bar 623.

Figure 7:
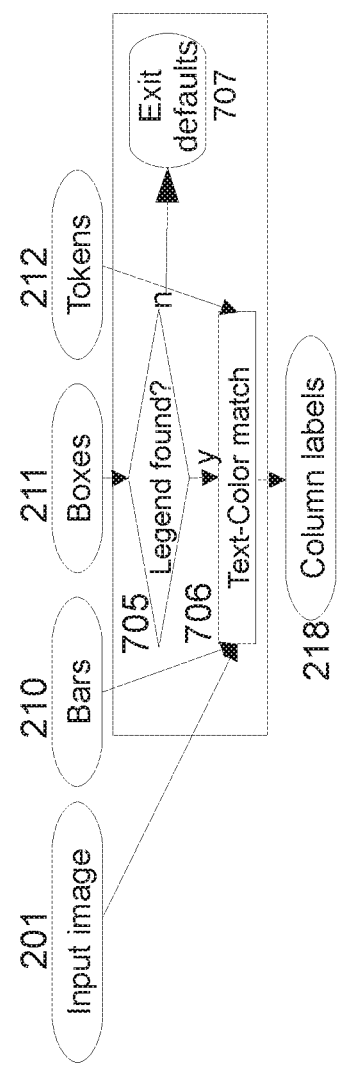
FIG. 7 is a high level flowchart of exemplary column label reading steps for a methodology according to principles of the invention.

Multi-series bar charts are usually provided with a legend containing the labels of the series (FIGS. 3c & 3d). In such cases, the labels associated with the series must be obtained by matching each color group with the corresponding "legend marker", i.e. a small rectangle or ellipse with the same color of the data series. Prior art does not parse the legend. With reference to FIG. 7, an exemplary method according to principles of the invention works in the following way. In step 705, check if the legend box is included in the boxes found by the ConvNet. If the legend was not found, exit and return default column labels, as in 707. If the legend box was found, the legend will be read. For each color group, the following text-color match steps 706 are repeated. Find the pixel P located inside the legend box and minimizing the euclidean distance between the color of the group S and the color of the pixel P, in a determined color space (e.g., the CIELAB color space [also known as CIE L*a*b* or sometimes abbreviated as simply "Lab" color space], which is a color space defined by the International Commission on Illumination). Match the pixel P to the closest sequence of tokens on its right side. The sequence of tokens on the right side represents the text associated to the legend marker. Associate and store the content of this text as the label of the color group S.

Figure 8:
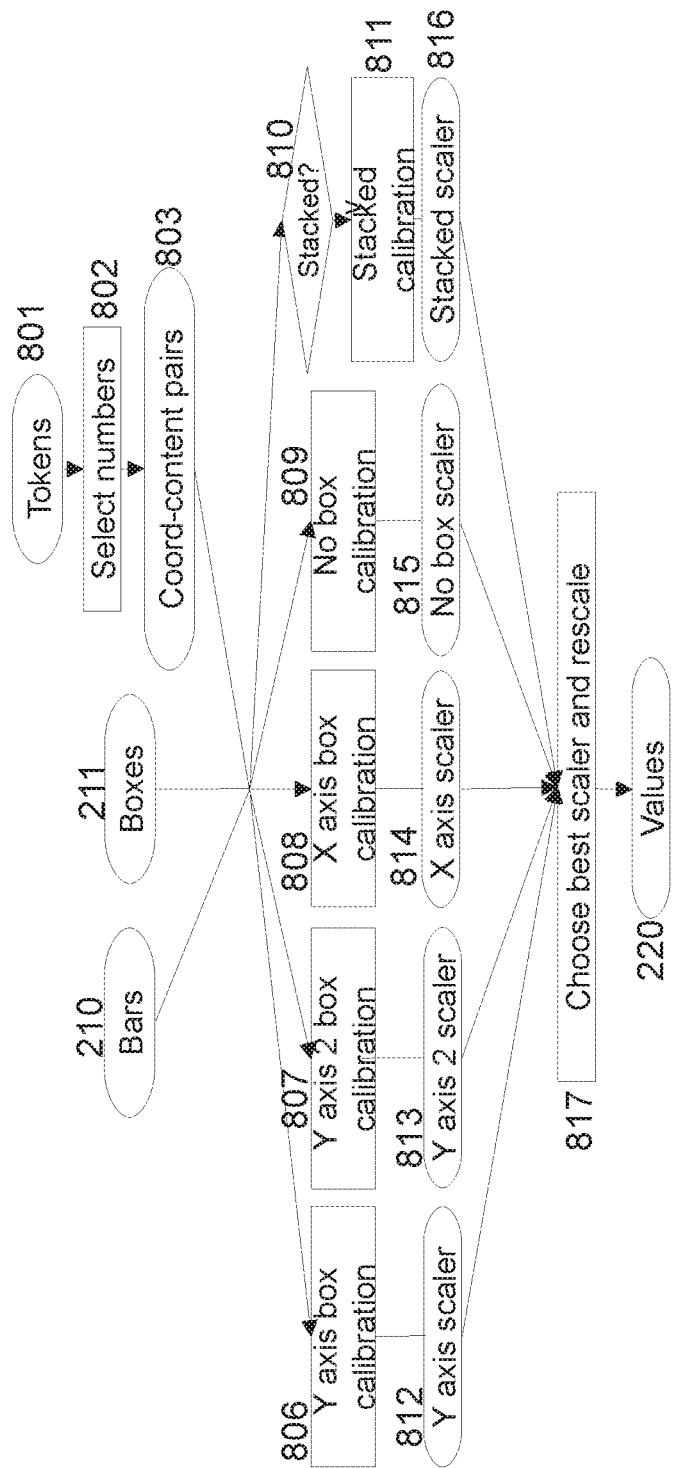
FIG. 8 is a high level flowchart of exemplary robust calibration steps for a methodology according to principles of the invention.

With reference to FIG. 8, Numerical values associated with bars' vertical height can be implicit e.g. not reported on the bar but reporting a scale of values on Y axis (as in FIGS. 3a, 3d & 3c), or explicit e.g. reported on top of the bar or within the bar itself (as in FIG. 3b). Below a method to extract values for the vertical bar charts is explained. Extension to the horizontal bar case is straightforward.

Let y(px) be the coordinates in pixel of a given numerical text in the image, and y(read) the numerical value read by the user. Since each position corresponds to some value in the chart, these two variables are coupled by a linear relation: $y^{(read)}=m \cdot y^{(px)}+q$ where m and q are coefficients to be found. For charts with logarithmic axes, the relation must be expressed in the logarithmic form: $\log 10(y^{(read)})=m \cdot y^{(px)}+q$. The precise determination of such relation (i.e. of the coefficients m and q) is crucial for an exact interpretation of the chart values. An exemplary method according to principles of the invention performs the following steps. In step 801, tokens are selected. The selected tokens represent numbers 802 and store the coordinate-content pairs $\{(y^{(px)}, y^{(read)})\}$ which respectively are the coordinate in pixel and the numerical value read in the token string 803. Note that those cases where the numbers are expressed in "human notation", e.g. using the letter "k" to indicate thousands, "M" for millions, etc., are also included.

With reference to steps 806-808, for each of the boxes representing the Y axis, the secondary Y axis (when present in the chart) and the X axis, select the pixel-value pairs of the previous step falling inside the axis box. Then feed these points to the robust calibration described below and determine the relations for the scaling. Each calibration produces a "scaler" object 812, 813, 814, which contain the coefficients of the linear relation, the points used in the calibration, and the calibration scores.

With reference to step 809, since some charts do not have an explicit axis for the values (as in FIG. 3b), an extra calibration without axis boxes is performed. The numbers located close to the bars represent explicitly the values of the bars. These numbers are first associated to the closest edge of the bar to which they refer. The numbers that cannot be matched to any bar edge are matched to their central position. These new (coordinate-content) pairs are then fed into the calibration steps to produce the "No box scaler" 815.

With reference to steps 810, 811 & 816, if the bar chart was recognized as stacked in the shape extraction module, an extra calibration is performed. In fact, stacked bar charts often contain numbers inside each bar segment to represent the segment value. Sometimes additional numbers are also found on top of the stacks to indicate the total sum of values in the stack. To deal with this special case, all the numbers located inside the bars are found and the pairs are stored {(bar length, content)}. These values are then used to create a new scaler, namely "Stacked scaler" 816.

With reference to step 817, the best scaler is chosen and rescaled. The best scaler is selected among all those evaluated in the previous steps. The selection is based on the calibration scores as explained above. The X scaler is obviously excluded if the bar chart is vertical (conversely the Y scalers are excluded if the bar chart is horizontal). The X scaler can be nevertheless used to rescale the labels. The best scaler is used to rescale the values of each bar by applying its linear (or logarithmic) relation to the bar top (for bars with positive value) or bottom (for bars with negative value) or length (for stacked bar charts). If there were numbers located close or inside the bars explicitly representing their values, they are now used again to adjust the result. To avoid wrong associations, the correction is accepted only if the numbers were considered as inliers in the calibration process.

The exemplary process performs robust calibration. For a given set of points D={(x,y)}, representing the coordinate-content pairs of numerical words, a goal is to find the linear relation y=m*x+q relating the highest number of points with the smallest error. This relation is found by means of a procedure that called "calibration" or "robust calibration", which can be seen as a linear regression process that must work also in the presence of many outliers. A constraint is added on the sign of the coefficient m, since it is assume that the values read in the chart increase from bottom to top (vertical bar charts) or from left to right (horizontal bar charts). The pipeline consists in the following steps. First, consider a pair of points {(x1,y1),(x2,y2)} in D and compute the coefficient m and the intercept q of the line passing through them. If the coefficient m does not satisfy the constraint, reject the pair. Then compute the errors $e\_i=|y\_i-m*x\_i-q|$. Assign a number of inliers to the pair (m, q) by counting the number of points whose error is below a fixed threshold error_scale. The error_scale is conveniently set as the median font-size of the numbers in the calibration. Finally assign a score to the pair (m, q) as score=sum(exp(−e_i/error_scale)). In this way, an exponentially decreasing score is given to the points which do not lie on the line (m, q). The foregoing steps are repeated to find the values (m, q) with the highest number of inliers and the highest score. In this way the calibration process will find the most reliable linear relation passing through the data points.

Such calibration meets the needs of the invention and is very fast, since the number of points used in the calibration is generally below 20. As a result, this calibration procedure does not appreciably add computational overhead to the entire process.

Figure 9:
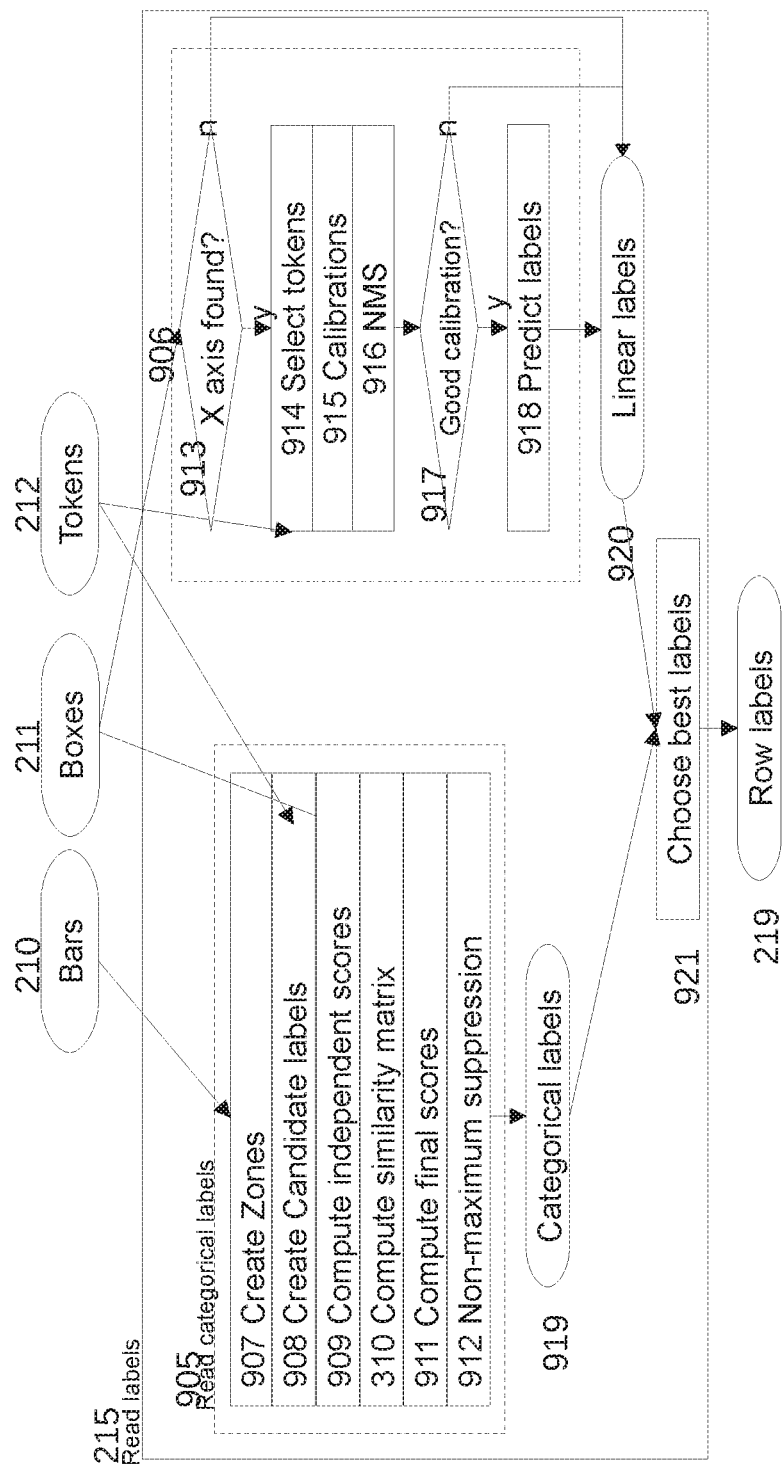
FIG. 9 is a high level flowchart of exemplary steps for assigning a label to each bar, or stack or cluster of bars, for a methodology according to principles of the invention.

With reference to FIG. 9, the goal of the "Read row labels" 215 is to assign a label to each bar, stack or cluster of bars. This corresponds to renaming the rows in the table associated to the bar chart. Our approach allows to assign labels in a very large variety of charts configuration, such as horizontal, grouped, stacked or even when the labels are between or inside the bars. With reference to step 906, in some cases the labels follow a linear relation representing numbers or dates. To handle these cases, a calibration is applied to the box of the X axis as in steps 913, 914, 915 & 916. If the calibration is reliable (i.e. has enough number of inliers) 917, it is used to predict the labels of all the bars (or stacks or group of bars) 918. This is particularly important in those cases where only a subset of the bar labels are explicitly written in the chart, while the other missing labels are to be guessed by interpolation by the human reader. This approach is also useful when the bar chart represents a time series and the x labels represent dates in any date format.

Figures 10A, 10B:
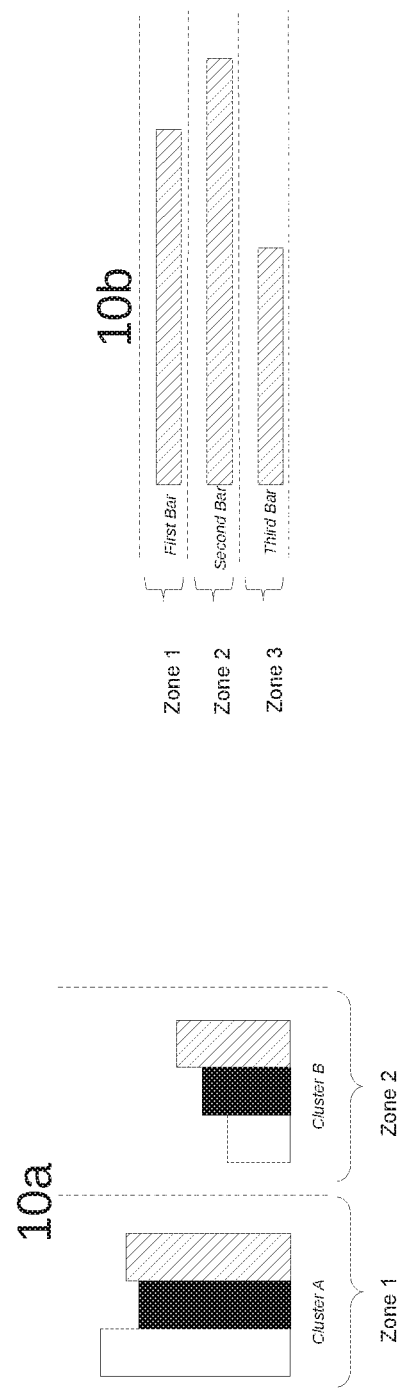
FIGS. 10a & b conceptually illustrate "zones" used in the read row labels steps of the flowchart of FIG. 9.

With reference to step 905, more frequently, the labels associated to the bars do not represent numbers or dates and are therefore "categorical". This situation is handled with the following process. A set of zones are created 907 to which are assigned a distinct label. FIGS. 10a and 10b illustrate "zones" used in the "read row labels" process. As shown in FIGS. 10a and 10b, these zones correspond to the regions enveloping the bars/stacks/groups for simple/stacked/grouped bar charts respectively. These regions extend in the y direction on the whole image size and do not overlap with each other.

Once a set of zones are established, assign to each of them a set of candidate labels by concatenating the tokens inside the zones, as in step 908. The candidate labels are chosen using the following supervised learning approach. First assign a score pi to each candidate label by using the likelihood obtained by a supervised learning method 909. The features used by this classifier concern textual information (the content of the labels) and spatial information (the relative position with respect to the bars). Since the labels have usually similar positions relative to the bars, increase the score of each label by looking at the other labels with similar arrangement. In order to do so, first compute a matrix Sij describing the spatial similarity between the candidate labels 910 and update the score by multiplying the score vector p by the matrix S 911. In this way, correlate the labels with each other, so that a set of labels with similar configuration will be preferred over a set of labels with different relative positions. The final categorical labels 919 are obtained by picking the candidate label with highest score from each zone 912.

Next, choose the best labels 921. After computing linear 920 and categorical labels 919, choose which to use by looking at the scores obtained in the calibration and in the label assignment.

Pie charts often include the percentage values explicitly written as numbers close to each slice. In order to exploit this useful information, the percentages evaluated in the Shape Analysis Module are corrected using the words read from the OCR. Each word representing a number is associated to the slice with the closest barycenter, and its value is assigned to the slice. This is done only if the correction does not exceed a fixed value Δ. The thresholding Δ is added in order to reduce possible OCR failures (e.g. if the subprocess has reconstructed the number 26.4% for a given slice while the OCR is reading the number 76.4%, the value is not adjusted because the difference is too large). All the percentages which have not been adjusted are then rescaled by imposing again the normalization so that the total sum remains 100%. This methodology associates the correct numerical values to the pie charts slices in a variety of different situations. This is one aspect of the invention that marks a difference with other methodologies. Correct values are automatically extracted from a large variety of pie charts and from applications in real cases.

Figure 11:
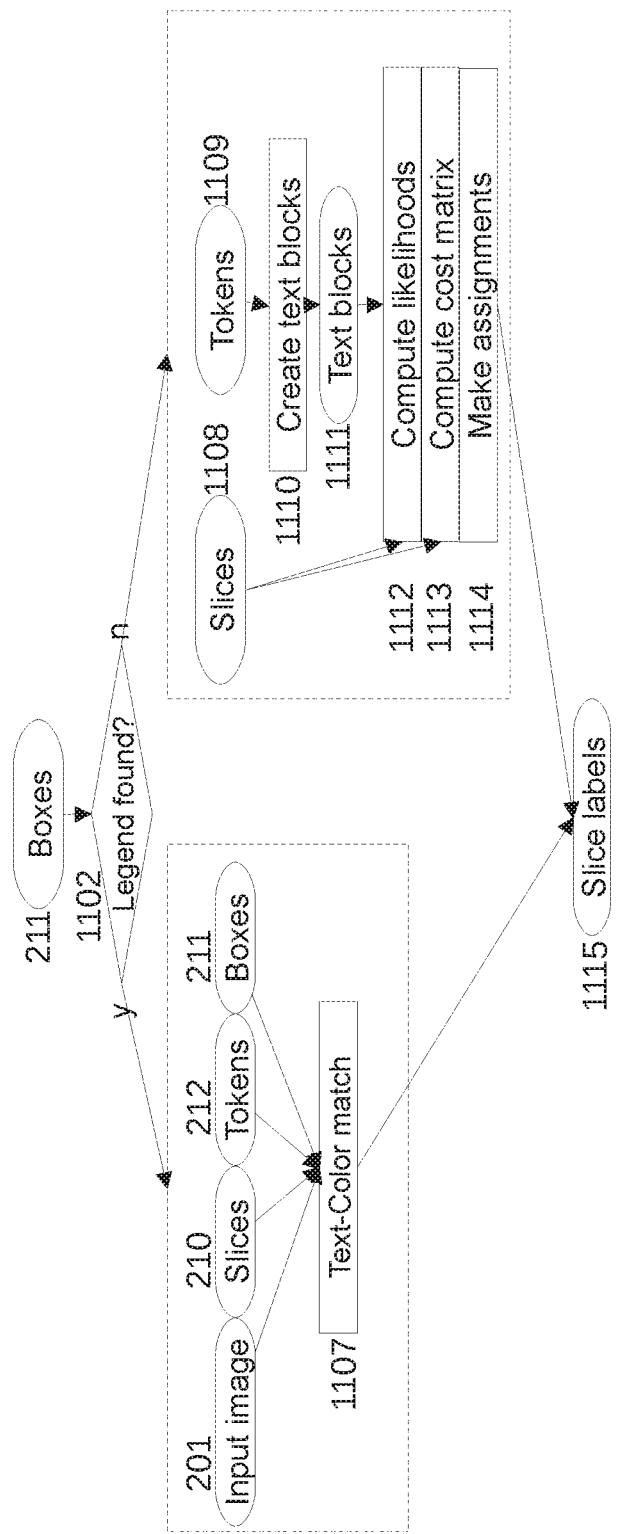
FIG. 11 is a high level flowchart of exemplary steps for assigning a label to each slice of a pie, for a methodology according to principles of the invention.

With reference to FIG. 11, the labels associated to the slices of a pie chart can be expressed in two (equally common) ways: inside a legend (as in FIG. 5b) or around the pie (as in FIGS. 5a, 5c, 5d). For this reason, the subprocess to read labels in pie charts works as follows. Check if the chart decomposition ConvNet has found a legend box 1102. In such case, the labels are read using the "Read column labels" process of bar charts 1107, which looks for color matches. If the legend was not found, the labels must be located around the pie. To read the labels, the tokens are first aggregated horizontally and vertically to form text blocks as in steps 1110, 1111). The text blocks are subsequently sent to a supervised-learning module which assigns to each of them a probability of representing a slice label, as in step 1112. This is achieved by looking at the position of the text blocks relative to the pie chart, as well as the textual content of the block. In this way the process is able to exclude extra text such as title, notes, numbers, etc. Another supervised learning module 1113 is responsible for computing a matrix {Cst} whose entries represent the costs of the association between slice s and text block t. The features used to estimate the element $C_{st}$ of the cost matrix come both from the slice s and the text-block t. In this way the model is able to give higher cost to unlikely associations. The final labels are obtained by applying the Hungarian method (aka, Hungarian algorithm, Kuhn-Munkres algorithm or Munkres assignment algorithm, as described in Kuhn, Harold W. "The Hungarian method for the assignment problem." Naval Research Logistics (NRL) 2.1-2 (1955): 83-97.) to the cost matrix C, as in step 1114. The Hungarian method is a combinatorial optimization algorithm that solves an assignment problem in polynomial time. In this way the total cost of the associations are minimized, under the constraint that each slice is assigned to a different text block, as in step 1115.

Several novelties introduced by the exemplary process according to principles of the invention. First, the use of a Convolutional Neural Network (ConvNet) allows decomposing the chart into its sub-parts (pie, axes and legend) with significant tolerance to the wide range of variations in shape and relative position of pies, axes and legends. The process is extremely robust to variations in color and shape for pies, axes and legends.

Second, the process allows correctly interpreting bar charts from any combination of the following subclasses/attributes: 1. Vertical or horizontal bar charts; 2. Grouped bar charts; 3. Stacked bar charts; 4. Signed bar charts, i.e. with both positive and negative bars; 5. With color effects and gradients; 6. 3D bar charts; 7. Bar charts without axes, i.e. with values directly written above or inside the bars.

Third, the process allows correctly parsing the following categories of pie charts: 1. Circular or elliptic pie charts; 2. Exploded pie charts, i.e. with one or more slices detached from the others; 3. Multiple pie charts, i.e. with two or more pie charts in the same image; 4. Donut charts; 5. Irregular pie charts, such as "half donut" charts or hand drawn charts; 6. 3D pie charts. The method recovers both the original layout and colors of the pie charts.

Fourth, the calibration method allows properly reading the values even when there are many OCR failures. The approach is by far more robust than any previous work, where mapping is obtained by using only the first and last values or the median slope of the relation or the average pixel-per-data ratio. When there are many OCR failures or many numbers in the image, it would be impossible to find the correct relation by using such simplistic approaches. The regression method of the invention is much more robust than other standard robust regression methods, such as RANSAC (used for example in Cliche, Mathieu, et al. "Scatteract: Automated extraction of data from scatter plots." Joint European Conference on Machine Learning and Knowledge Discovery in Databases. Springer, Cham, 2017) or least squares with Huber loss (Huber, Peter J. "Robust estimation of a location parameter." The annals of mathematical statistics (1964): 73-101).

Fifth, the method to recognize and associate labels to bar charts according to the invention works in a great variety of situations since does not make any assumption about the position of the labels. The labels can be located below the bars (as it is usually found), but also on their top, middle, or even in between. The method allows matching labels with any degree of text rotation.

Sixth, the match of text with slices constitutes one of the biggest problems in the reading of a pie chart, especially when the pie is sectored in many tiny slices. The approach of the invention is based on machine learning on several geometric and textual features and makes use of the Hungarian algorithm for the associations. The combination of the Hungarian algorithm steps and the machine learning approach allows matching text to slices with a high success ratio.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A chart extraction method comprising steps of:
   receiving an image of a chart in a convolutional neural network;
   defining bounding boxes in the image corresponding to graphically represented data in the image, said graphically represented data including one of a plurality of bars and a plurality of slices, and, in the case of a plurality of bars, determining, for each bar of the plurality of bars, a ratio of a length of the bar to a length of a longest bar in the plurality of bars; and in the case of a plurality of slices, determining a center and radius for any slice of in plurality of slices, and transforming the plurality of slices into a new image by applying a polar transformation using the determined center and radius;

determining a relative position, a color and a value for each bounding box corresponding to graphically represented data;

defining at least one bounding box in the image corresponding to at least one of a legend and axis;

determining a relative position and an area for each bounding box corresponding to at least one of a legend and axis;

defining bounding boxes in the image corresponding to text;

determining a relative position of each bounding box corresponding to text, and determining corresponding text by performing optical character recognition on each bounding box corresponding to text;

writing to a file: the relative position, color and value for each bounding box corresponding to graphically represented data; the relative position and area for each bounding box corresponding to at least one of a legend and axis; and the relative position of each bounding box corresponding to text, and the corresponding text.

2. The method of claim 1, wherein the image of a chart is an image of a pie chart including the plurality of slices, each slice comprising a percentage of the pie chart and each slice having a color, and the step of defining bounding boxes in the image corresponding to graphically represented data in the image further comprises determining the percentage for each slice and determining the color for each slice.

3. The method of claim 1, wherein the image of a chart is an image of a pie chart, the pie chart being a three dimensional pie chart, and the step of defining bounding boxes in the image corresponding to graphically represented data in the image further comprises applying a perspective correction to the pie chart.

4. The method of claim 1, wherein the image of a chart is an image of a bar chart including the plurality of bars, each bar having a color, and the step of defining bounding boxes in the image corresponding to graphically represented data in the image further comprises determining the color for each bar.

5. The method of claim 1, wherein the image of a chart is an image of a pie chart comprising the plurality of slices, and the step of defining bounding boxes in the image corresponding to graphically represented data in the image further comprises cropping the pie chart, the new image comprising a plurality of bars, each of the plurality of bars representing a slice.

6. The method of claim 1, wherein the step of defining at least one bounding box in the image corresponding to at least one of a legend and axis comprises defining a bounding box in the image corresponding to at least one of an X-axis, a legend, and a Y-axis.

7. The method of claim 1, wherein the step of defining at least one bounding box in the image corresponding to at least one of a legend and axis comprises defining a bounding box in the image corresponding to at least one of an X-axis, a legend, and a Y-axis, and a right axis.

8. The method of claim 1, wherein the step of defining at least one bounding box in the image corresponding to at least one of a legend and axis comprises defining a bounding box in the image corresponding to a legend and the method further comprises parsing the legend.

9. The method of claim 1, wherein the step of determining corresponding text by performing optical character recognition on each bounding box corresponding to text further comprises determining if the corresponding text is a value for each bounding box corresponding to graphically represented data.

10. The method of claim 1, wherein the step of performing optical character recognition on each bounding box corresponding to text comprises performing a linear regression.

11. The method of claim 10, wherein the step of associating at least one bounding box corresponding to text to at least one bounding box corresponding to graphically represented data, comprises performing combinatorial optimization.

12. A chart extraction method comprising steps of:
receiving an image of a chart in a convolutional neural network;

defining bounding boxes in the image corresponding to graphically represented data in the image, said graphically represented data including one of a plurality of ban and a plurality of slices, and, in the case of a plurality of bars, determining, for each bar of the plurality of bars, a ratio of a length of the bar to a length of a longest bar in the plurality of bars; and in the case of a plurality of slices, determining a center and radius for any slice of in plurality of slices;

determining a relative position, a color and a value for each bounding box corresponding to graphically represented data;

defining bounding boxes in the image corresponding to text;

determining a relative position of each bounding box corresponding to text, and determining corresponding text by performing optical character recognition on each bounding box corresponding to text;

associating at least one bounding box corresponding to text to at least one bounding box corresponding to graphically represented data, based upon relative location of the at least one bounding box corresponding to text in relation to the relative location of the at least one bounding box corresponding to graphically represented data;

writing to a file: the relative position, color and value for each bounding box corresponding to graphically represented data; the relative position and area for each bounding box corresponding to at least one of a legend and axis; and the relative position of each bounding box corresponding to text, and the corresponding text.

13. The method of claim 12, wherein the image of a chart is an image of a pie chart including the plurality slices, each slice comprising a percentage of the pie chart and each slice having a color, and the step of defining bounding boxes in the image corresponding to graphically represented data in the image further comprises determining the percentage for each slice and determining the color for each slice.

14. The method of claim 12, wherein the image of a chart is an image of a pie chart, the pie chart being a three dimensional pie chart, and the step of defining bounding boxes in the image corresponding to graphically represented data in the image further comprises applying a perspective correction to the pie chart.

15. The method of claim 12, wherein the image of a chart is an image of a bar chart including the plurality bars, each bar having a color, and the step of defining bounding boxes in the image corresponding to graphically represented data in the image further comprises determining the color for each bar.

16. The method of claim 12, wherein the image of a chart is an image of a pie chart having the plurality of slices, and the step of defining bounding boxes in the image corresponding to graphically represented data in the image further comprises cropping the pie chart, the new image comprising a plurality of bars, each of the plurality of bars representing a slice.

17. The method of claim 12, wherein the step of determining corresponding text by performing optical character recognition on each bounding box corresponding to text further comprises determining if the corresponding text is a value for each bounding box corresponding to graphically represented data.

18. The method of claim 12, wherein the step of performing optical character recognition on each bounding box corresponding to text comprises performing a linear regression.

19. The method of claim 18, wherein the step of associating at least one bounding box corresponding to text to at least one bounding box corresponding to graphically represented data, comprises performing combinatorial optimization.

20. The method of claim 12, wherein the step of determining corresponding text by performing optical character recognition on each bounding box corresponding to text further comprises determining if the corresponding text is a value for each bounding box corresponding to graphically represented data; and the step of performing optical character recognition on each bounding box corresponding to text comprises performing a linear regression; and the step of associating at least one bounding box corresponding to text to at least one bounding box corresponding to graphically represented data, comprises performing combinatorial optimization.

\* \* \* \* \*